United States Patent [19]

Asberg

[11] Patent Number: 4,913,450
[45] Date of Patent: Apr. 3, 1990

[54] SEAL

[75] Inventor: Sture Asberg, Vastra Frolunda, Sweden

[73] Assignee: SKF Nova AB, Goteborg, Sweden

[21] Appl. No.: 361,703

[22] Filed: Jun. 1, 1989

Related U.S. Application Data

[63] Continuation of Ser. No. 87,099, Aug. 19, 1987, abandoned.

[30] Foreign Application Priority Data

Sep. 15, 1986 [SE] Sweden .................................. 8603854

[51] Int. Cl.$^4$ .............................................. F16C 33/72
[52] U.S. Cl. ...................................... 277/68; 277/95; 277/133; 384/482
[58] Field of Search ............... 389/481, 482, 484, 472; 277/68, 25, 133, 134, 95, 92, 151, 153

[56] References Cited

U.S. PATENT DOCUMENTS

| | | | |
|---|---|---|---|
| 3,667,767 | 6/1972 | Bakewell | 277/133 |
| 4,275,889 | 6/1981 | Butler et al. | 277/92 |
| 4,421,321 | 12/1983 | Lipschitz | 277/133 |
| 4,615,530 | 10/1986 | Powell | 277/152 |
| 4,721,312 | 1/1988 | Hornberger | 277/68 |

Primary Examiner—Allan N. Shoap
Assistant Examiner—Jeffrey J. Hohenshell
Attorney, Agent, or Firm—Eugene E. Renz, Jr.

[57] ABSTRACT

The invention refers to a seal for bearing spaces, wall channels for shafts and the like, where the seal is fitted to the shaft. The seal is characterized in that it incorporates a sheet metal strutting projecting radially outwards, and on the side facing away from the space intended to be sealed off being equipped with mainly radially extending vanes, the radial extension of which mainly coincide with the radial extension of the sheet metal strutting.

2 Claims, 1 Drawing Sheet

SEAL

This application is a continuation of 07/087,099 filed 8/19/87, now abandoned.

FIELD OF THE INVENTION

The present invention refers to sealings of the type intended for sealing off bearing spaces, wall channels for shafts and the like.

BACKGROUND OF THE INVENTION

Seals of the above-mentioned type are earlier known and exist in a very large number of embodiments. They usually are fitted to the non-mobile part and seals against the rotating shaft, or some member fitted thereto, by means of one or more sealing lips which preferably consist of rubber. Seals fitted to the rotating shaft are also known. The common feature of all these seals is that the sealing lip shall be given a proper pressure against another part in the device and thus prevent dirt, water and the like from penetrating into the space intended to be sealed off. It is very important that the lip contacts with a suitable pressure. If this pressure becomes too high the friction will be too big and if it becomes too low, then the sealing function will be poor.

The space outside the seal sometimes can be very fouled, which puts big demands on the seal. In order to obtain a satisfactory sealing effect, there is sometimes provided several seals, often of different types, such as lip seals combined with labyrinth seals. One purpose thereof is that such a low amount of dirt as possible shall come into contact with the final inner seal. Such an arrangement with several seals can be complex and thereby also expensive to manufacture as well as assemble.

SUMMARY OF THE INVENTION

In order to solve the problem of sealing off against heavily fouled surroundings, in a simple manner, without the use of combinations, the invention proposes a seal for bearing spaces, wall channels for shafts and the like whereby the seal is fitted to a shaft intended for rotation, and which is characterized thereby that it incorporates a sheet metal strutting projecting radially outwards, and, on the side facing away from the space intended to be sealed off, is equipped with mainly radially extending vanes, the radial extension of which mainly coincide with the radial extension of the sheet metal strutting.

According to the invention the vanes in the seal should be made from rubber and be bonded to a sheet metal strutting in the seal.

It is also eligible that the sheet metal strutting in the seal is bent axially outwards in the vicinity of the shaft and that the vanes emanate from this bend.

On the side of the seal facing the space intended to be sealed off, the seal according to the invention should be provided with one or more sealing lips of rubber.

BRIEF DESCRIPTION OF THE DRAWINGS

The invention hereinafter will be further described with reference to the drawings, where.

DESCRIPTION OF THE PREFERRED EMBODIMENT

Figure 1:
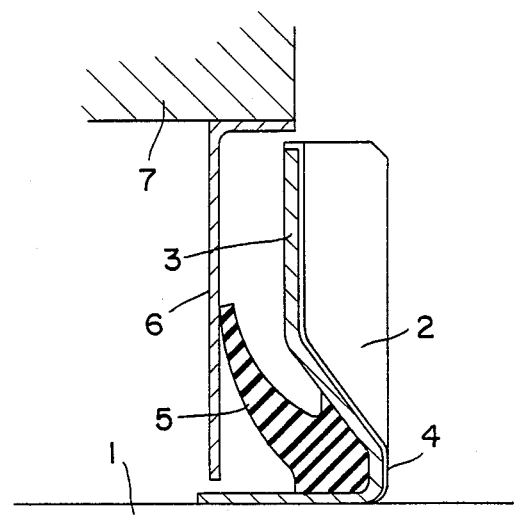
FIG. 1 shows a section through a seal according to the invention fitted to a shaft.

FIG. 1 shows a shaft 1, on which is fitted a seal according to the invention incorporating radial vanes 2, which are bonded to a sheet metal strutting. Such as shown this sheet metal strutting 3 is provided with a bend 4 near the shaft 1. The vanes 2 emanate from this bend 4, which also will give strength to the vanes 2. The bend 4 also acts as mounting surface for the seal. On the inner side of the sheet metal strutting 3 there is a sealing lip 5, which in the present case contacts against a sheet metal member 6 and seals off against this. The sheet metal member 6 is fittedly mounted in a wall 7 or the like and is consequently nonrotating.

Figure 2:
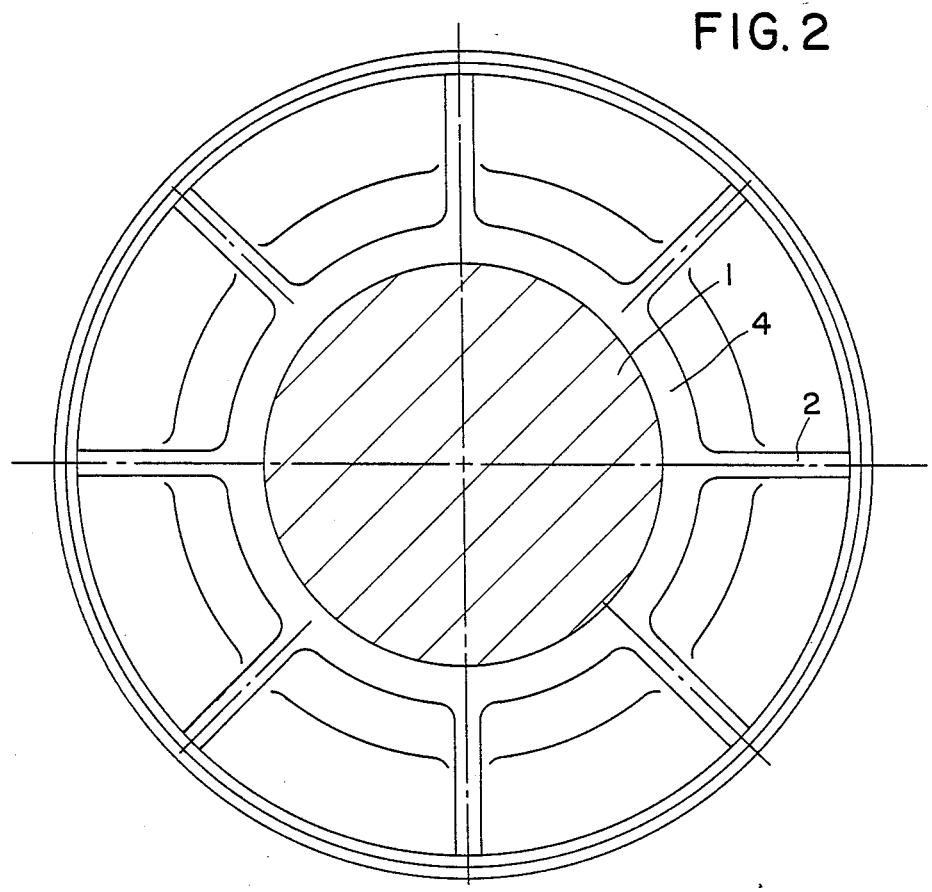
FIG. 2 shows the same seal when seen from the side and from the outside.

In FIG. 2 is shown the outer side of the seal, and this figure clearly shows the vanes 2. The number of such vanes is variable. A proper number is 8 vanes.

The purpose of the vanes 2 according to the invention is to improve the fling-off effect of the seal so that particles, liquid droplets or other dirt on the outside of the seal shall be thrown out and thus not come into the vicinity of the sealing lip 5. The particular configuration and arrangement of the seal provides an increased cooling effect due to the turbulence created in the ambient atmosphere surrounding the seal.

The seal according to the invention presents a simplified improvement of earlier known seals, and the additional cost for the improvement is in the embodiment shown only a cost of the material in the vanes 2.

The invention is not limited to the embodiments mentioned above but can be varied in different manners within the scope of the claims.

What is claimed is:

1. A seal for sealing the space between relatively rotatable members comprising an inner plate fixed to one of the members extending across the space to be sealed, a rigid strut member projecting across the space and spaced from the inner plate, a flexible seal interposed between the inner plate and strut member having a sealing lip engaging the inner plate at a point along an inner face of the plate and means defining a plurality of vanes emanating from an outer face of the strut member whereby deflection caused by axial forces acting on the outer face of the strut does not change the sealing relation between flexible seal and the inner plate.

2. A seal for sealing the space between relatively rotatable members comprising:
   an inner plate fixed to one of the members extending across the space to be sealed,
   a rigid strut member projecting across the space to be sealed,
   said strut member having a radially extending, circumferential flange portion generally parallel to the inner plate and an axially extending, frusto-conical base portion sealingly mounted on a shaft member,
   a flexible seal interposed between the inner plate and the strut member having a sealing lip engaging the inner plate at a point along an inner face of the inner plate, and
   means defining a plurality of vanes emanating from an outer face of the strut member whereby deflection caused by axial forces acting on the outer face of the strut member does not change the sealing relation between the flexible seal and the inner plate.

* * * * *